United States Patent [19]
Bishop

[11] Patent Number: 4,805,888
[45] Date of Patent: Feb. 21, 1989

[54] ORBITAL-ACTION CLAMPS

[76] Inventor: Maurice E. Bishop, Moultonville Rd., Center Ossipee, N.H. 03814

[21] Appl. No.: 239,050

[22] Filed: Aug. 30, 1988

Related U.S. Application Data

[63] Continuation of Ser. No. 93,081, Sep. 1, 1987, abandoned, which is a continuation of Ser. No. 838,092, Mar. 10, 1986, abandoned.

[51] Int. Cl.[4] ............................................. B25B 1/08
[52] U.S. Cl. ..................................... 269/99; 269/235
[58] Field of Search ................................ 269/229–237, 269/305, 99–100, 196

[56] References Cited

U.S. PATENT DOCUMENTS

| | | | |
|---|---|---|---|
| 449,039 | 3/1891 | Fletsch | 269/235 |
| 1,102,814 | 7/1914 | Streit | 269/235 |
| 1,685,899 | 10/1928 | Andrew | 269/235 |
| 2,430,613 | 11/1947 | Hodge | 269/231 |
| 3,473,420 | 10/1969 | Boggs | 269/235 |

Primary Examiner—Robert C. Watson
Attorney, Agent, or Firm—James E. Mrose

[57] ABSTRACT

Quick-action clamping, for holding workpieces in machine tools, and the like, is developed via orbital movements of a clamp member as induced by relative rotation of the mated eccentric head portion of a cooperating special machine screw threadedly engaged with a suitable mount. In a simple and economical expression of the clamp in a highly-advantageous low-profile form, the bolt is adapted from a steel hex-socket button-head scap screw, by machining a cylindrical exterior to its head in a laterally-offset relation to the central longitudinal axis of the cap screw, and the eccentric head of that modified screw member is fitted within an accommodating cylindrical recess in a shallow brass nut-like clamp member having "flats" about its periphery. With the threaded end of the bolt received within a tapped hole of a mount, a mere half turn effected by an Allen wrench in turn develops maximum orbital motion of the clamp member and resulting lateral movements of the flats, any one of which may serve to press against and hold a nearby workpiece; equally rapid and convenient release is then achieved by reversing the turn of the bolt.

3 Claims, 2 Drawing Sheets

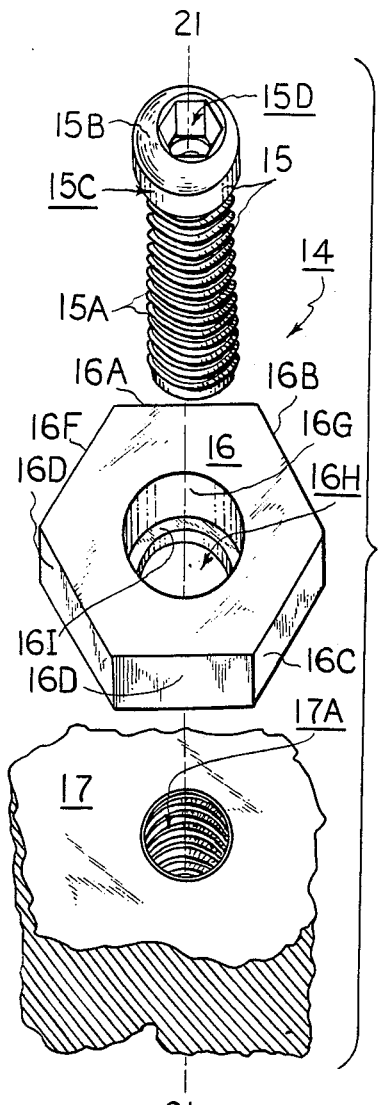
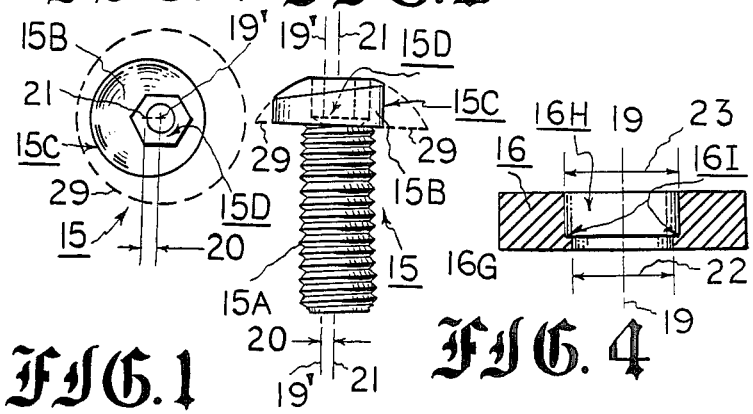
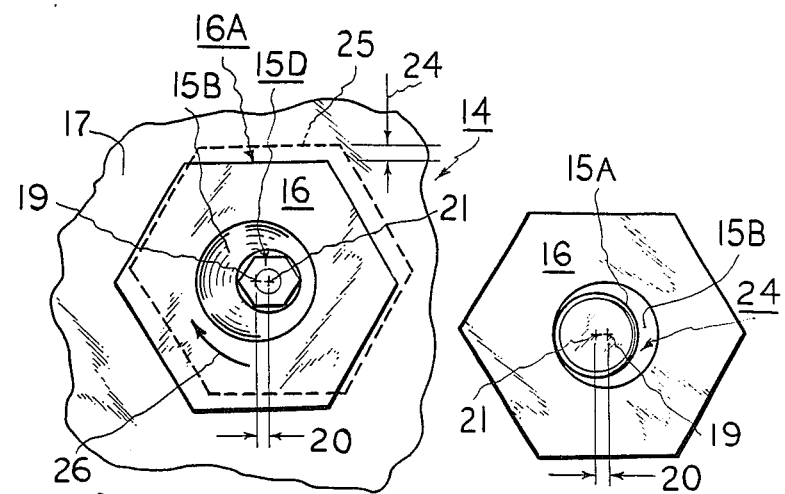
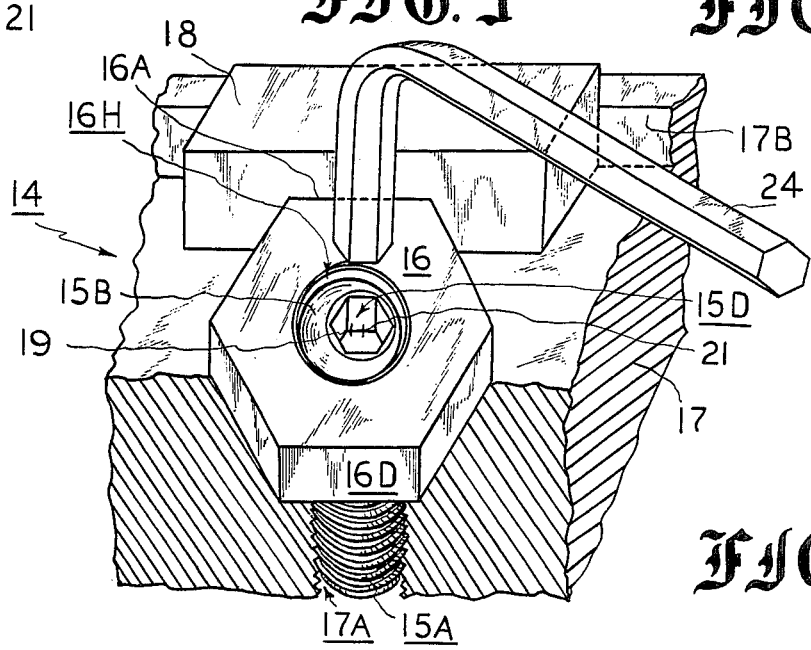
FIG. 1  FIG. 2  FIG. 3  FIG. 4  FIG. 5  FIG. 6  FIG. 7

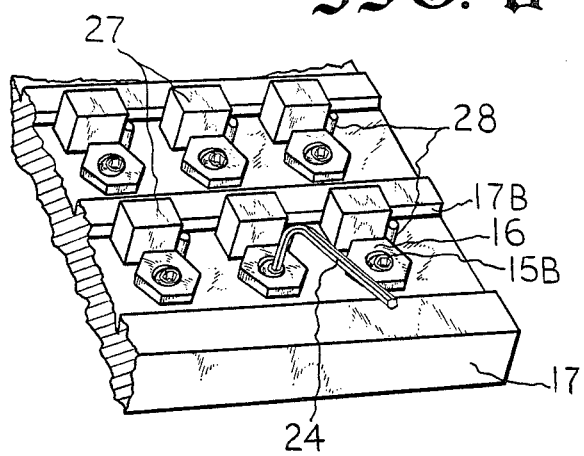
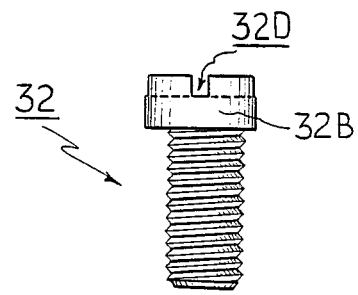
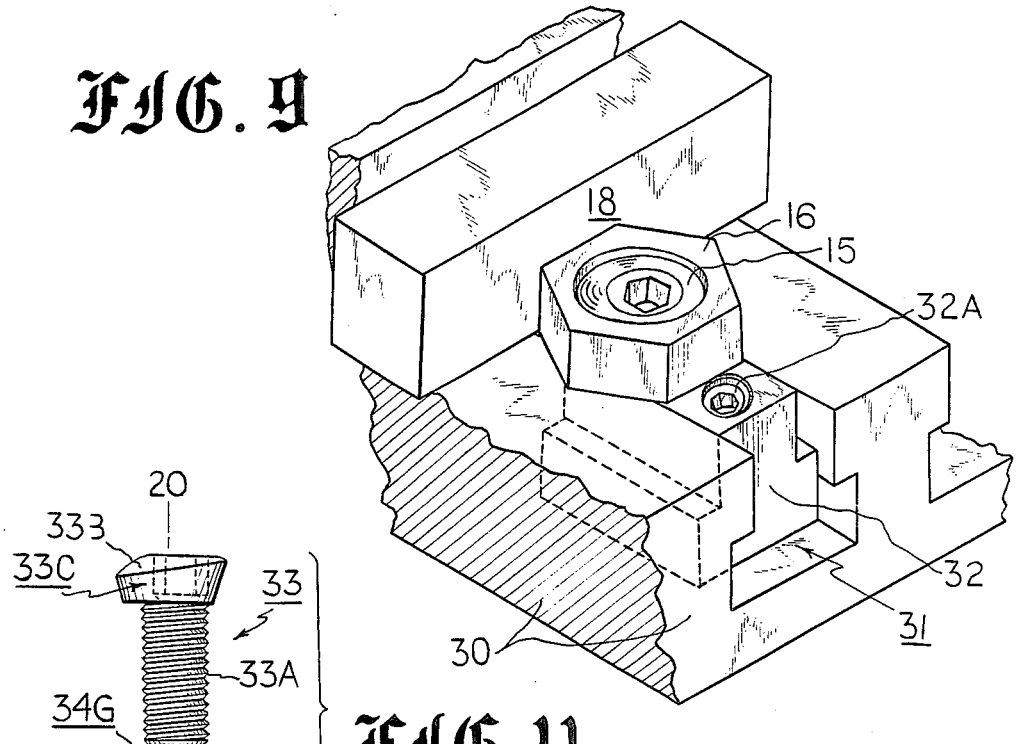
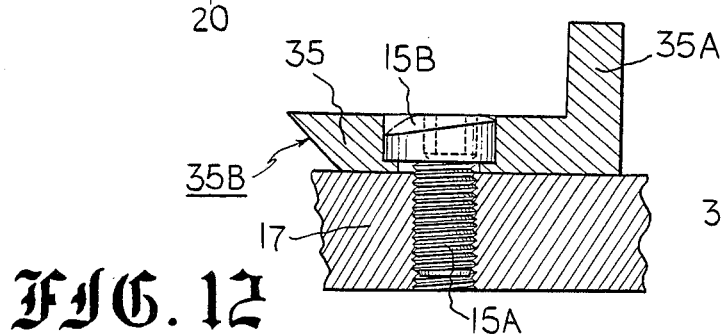
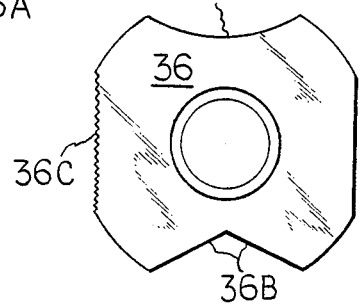

ORBITAL-ACTION CLAMPS

This is a continuation of a co-pending application Ser. No. 093,081 filed on Sept. 1, 1987 now abandoned, which is a continuation of co-pending application Ser. No. 838,092 filed Mar. 10, 1986 now abandoned.

BACKGROUND OF THE INVENTION

The present invention relates to improvements in quick-action miniature clamps for securely holding workpieces and the like, and, in one particular aspect, to novel and advantageous orbital-motion clamps which lend themselves to low-cost fabrication and to ready installation and rapid low-profile clamping of workpieces which are to undergo machining.

Numerous forms and types of clamps have long been known in the art, including those which rely upon such mechanisms as screw threads, wedges and/or cams to develop motions which will press or hold items in place while they are being processed in some manner. In connection with machine-tool operations, for example, there are many different powered tools which are designed to operate in diverse ways upon workpieces of various shapes and bulks; economy often dictates that a substantial number of such workpieces be collected closely together and machined in group fashion, particularly if they are relatively small, and that of course suggests that whatever strong clamping is used to hold them reliably should nevertheless not obstruct or unduly retard machining operations, and, also, that it should be possible to both clasp and release the workpieces quickly and easily. A system in which screw-threading serves to force clamp bars against a machined workpiece appears in U.S. Pat. No. 4,526,354, but there the bars must extend over the workpiece and springs are used to facilitate release. Wedging action is relied upon to exert holding pressures in a machine tool bed in U.S. Pat. No. 4,208,045; however, that arrangement involves complexities, bulk and adjustment difficulties which do not favor its use to hold numerous small parts. In respect of camming-type clamps, U.S. Pat. No. 2,788,688 employs a lever-operated cam in a bench vise, and U.S. Pat. No. 2,430,613 utilizes cams in the nature of eccentric wedge blocks which should be screw-locked in place, and U.S. Pat. Nos. 4,157,819 and 4,477,064 respectively show a pair of oppositely-spiralling clamps and eccentrically-pivoted discs, both relying upon wedging actions to oppose unintended loosenings.

SUMMARY OF THE INVENTION

The present invention is aimed at improving the means by which items of even low height and small size may be clamped and held securely without interfering with machining or other access to them and without entailing high cost and user skill. In one preferred embodiment, each of the intended locations of a number of workpieces on a platen upon which they are to be mounted for machining is equipped with a special two-piece adjustable clamp having certain simplicities and niceties which resemble those of a common nut and bolt. The bolt-like portion of each clamp has a lower end threaded into a cooperating tapped hole in the platen, and has an eccentrically-offset upper end about which a shallow nut-like portion is socketed for orbital camming movements. For the latter purposes, the nut-like portion of the two-piece combination is closely fitted for relative angular motion about the axis of the eccentrically-offset upper end of the bolt-like portion, and its lateral periphery is shaped to present a "flat" or some other suitable clamping surface which will engage the side of a nearby workpiece and thereby restrain its rotation. Instead, as the bolt-like portion is turned, with the aid of an Allen wrench fitted into an accommodating hex socket at its upper end, for example, the angularly-restrained nut-like cam portion will orbit and its camming surface will move laterally by an amount equal to the eccentric offset for each mere half turn. Such orbitally-induced lateral motion suffices to effect strong clamping action on the workpiece in conjunction with other fixed locating provisions on the platen, and, once tightened, the combination tends to lock until positively released by reverse-direction wrenching.

Accordingly, it is one of the objects of the present invention to provide unique and improved orbital-action clamps, for machined workpieces and the like, which are of very simple and economical construction and offer reliable strong clamping action in an advantageously low-profile configuration.

A further object is to provide novel clamping by way of orbitally-induced motion of a clamp member pivoted about an eccentrically-offset bearing portion of an angularly-adjustable shaft.

BRIEF DESCRIPTION OF THE DRAWINGS

Although the aspects and features of this invention which are considered to be novel are expressed in the appended claims, further details as to preferred practices and as to further objects and characteristics thereof may be most readily comprehended through reference to the following detailed description when taken in connection with the accompanying drawings, wherein.

FIG. 1 is an "exploded" pictorial and partly sectioned representation of components of an improved orbital-action clamp and a portion of an associated mount;

FIG. 2 is a top plan view of the bolt-like portion of the same clamp, together with a dashed-line representation of an outline of material removed from the head of a button-head cap screw from which that portion is fashioned;

FIG. 3 is a side elevational view of that same bolt-like portion, together with a dashed-line outline characterizing material removed from a button-head cap screw to form an eccentric offset through which orbital motion may be derived;

FIG. 4 is a cross-section side view of the nut-like portion of the same clamp.

FIG. 5 provides a top plan view of a clamping arrangement like that of FIG. 1, together with dashed linework characterizing orbital-motion displacement of the nut-like clamp portion thereof;

FIG. 6 is a bottom plan view of the united bolt-like and nut-like portions of the same clamp;

FIG. 7 illustrates pictorially, and partly in cross-section, an assembly of the same clamp and mount in association with a clamped workpiece and an adjustment wrench;

FIG. 8 portrays a number of such clamps mounted on a platen carrying several workpieces;

FIG. 9 represents an improved clamp holding a workpiece by way of a T-shaped block locked within a T-slotted work table of a machine tool;

FIG. 10 depicts a modification of a bolt-like portion of the clamp allowing its turning by a screwdriver-type implement;

FIG. 11 represents a side view of an alternative bolt-like clamp portion with a tapered eccentric offset and of a cross-sectioned cooperating tapered-bore nut-like clamp portion;

FIG. 12 provides a cross-section of an assembled taper-to-taper orbital clamp arrangement of FIG. 12, in which the orbiting clamp member is in the form of an angle bracket; and FIG. 13 is a top plan view of an orbital-motion clamp member having side surfaces of a number of different configurations lending themselves to cooperating uses with workpieces of various shapes.

DETAILED DESCRIPTION OF THE PREFERRED EMBODIMENTS

Having reference to the drawings, wherein like reference characters designate identical or corresponding parts throughout the different views, and more particularly to FIGS. 1 and 7 thereof, one embodiment of an improved orbital-action clamping arrangement, 14, is shown to include a bolt-like portion 15 and a cooperating nut-like orbital clamp member 16, both of which are assembled atop a mounting platen 17 by way of a tapped hole 17A accommodating the externally-threaded lower end 15A of the bolt-like portion of the clamp. The illustrated shallow clamp member 16, which is to undergo orbiting to effect clamping and release of a workpiece such as 18(FIG. 7), has six symmetrical sides or "flats" 16A–16F which impart to it the appearance of a hexagonal machine nut. For the purposes under discussion, there may be more or fewer sides, or such flat sides may have another shape, but, in any event, they should be capable of engaging a workpiece of some accommodating shape and, upon doing so, should restrain the clamp member from rotating about its own central axis 19—19 (FIGS. 4, 5, 6 and 7) and thereby cause it to orbit instead under influence of the eccentrically-offset upper end 15B of the cooperating bolt-like member 15. That upper end has an essentially cylindrical periphery 15C whose central longitudinal axis 19'—19' is laterally offset by a small amount, 20(FIGS. 2, 3, 5 and 6), from the parallel longitudinal axis 21—21 of the threaded lower end of member 15. Cylindrical periphery 15C serves as a crankshaft bearing outer surface for the closely-fitting inner bearing surface 16G of the shallow nut-like clamp member 16, the latter surface being formed by a cylindrical bore 16H centered along axis 19—19. A thin shoulder 161(FIGS. 1 and 4) is left at the bottom of the bore, its inner diameter 22 (FIG. 4) being less than the diameter 23 of the crankshaft bearing surfaces 15C and 16G but slightly in excess of the sum of the diameter of the threaded lower end of member 15 plus the aforementioned lateral offset 20. As is evident from the showing in FIG. 6, that excess leaves needed space, such as 24, which will accommodate orbital movement of member 16 around member 15 without any jamming against its lower end 15A.

When cooperating clamp members 16 and 15 are fully mated, with the eccentric upper end 15B nested within the bore 16H, the axes 19—19 and 19'—19' coincide and the clamp member 16 is necessarily offset in an eccentric relation to the central longitudinal axis 21—21 of member 15; that eccentric relation is preserved when the threaded lower end 15A is screwed into the tapped hole 17A of the mount 17. Importantly, the bolt-like member is not left fully tightened in the tapped hole of the mount, but is instead backed off by about one or one-and-a-half turns, such that the nut-like member 16 will not be jammed immovably against the platen 17. In the embodiment under discussion, the upper end 15B of the bolt-like member has a conventional form of hex socket, 15D, into which a common Allen wrench 24(FIG. 7) may be inserted to effect turning of member 15, with resulting orbital clamping movement of member 16. About a quarter turn can move one of the clamp flats, such as 16A(FIG. 5), laterally by a distance, 24, about the same as the aforesaid offset amount 20, as is indicated by the dashed linework 25 representing the clockwise non-rotating orbital shift of member 16 as the bolt-like eccentric part 15B is rotated a quarter turn in the direction of arrow 26 about axis 21. A maximum lateral orbiting shift twice that amount can be realized through a mere full half turn of the bolt-like member 15. FIG. 7 shows how that clamping assembly can be used to lock a workpiece 18 in place on a mount 17, the clamp flat or face 16A being engaged with and securely holding that workpiece against at least one fixed mechanical stop surface 17B. Clamping and release of workpieces in a set-up can occur quickly with a simple partial turn of an inserted wrench 24, and the unusually shallow height of the clamping assembly avoids any obstruction of or interference with a machine tool as it engages or passes over the workpieces. A compact multiple-workpiece arrangement, such as is common for economic automatic machining, ad which derives special advantage from the small size and low profile and quick-action clamping and release, appears in FIG. 7, where each of the clamps is like that already described and where the several workpieces 27 are further located by stop pins 28.

One convenient low-cost practice for the fabrication of the bolt-like member 15 with an eccentrically-offset upper end 15B involves the special machining of a commercially-available button head cap screw, such as one of treated steel, already having a useful hex socket in its rounded cap, as well as an externally-threaded stem below. The caps of such screws originally have an outline such as is represented by dashed linework 29 in FIGS. 2 and 3, and, for present purposes, the material extending laterally beyond the desired eccentric cylindrical bearing surface 15C is simply removed by machining. Nut-like clamp member 16 is preferably of a less hard material, such as brass, and is thus less likely to mar a workpiece or inadvertently damage an expensive tool; its fabrication likewise requires but relatively simple machining.

For some applications, the removable clamping arrangement may itself usefully incorporate a special mounting element, rather than being fitted with a tapped hole in a mounting platen . Such an array is depicted in FIG. 8, where the earlier-described form of bolt-like member, 15, and nut-like clamp member, 16, are associated with a workpiece-mount in the form of a T-slotted table 30, that known type of table having a slot 31 in the shape of an inverted "T". An associated T-shaped "nut" member 32, which fits well within the correspondingly-shaped slot 31, is used to mount the clamp members on the table, that nut member being equipped with a set screw 32A which, when tightened, pushes the nut member into a tightened and locked position. With the nut member located and locked in a desired place on the table, the orbital clamp member 16 may then be wrench-adjusted via the cooperating member 15 to quickly clamp or release a workpiece 18.

The FIG. 10 modification of the bolt-like clamp member 15 to another form, 32, involves a slotted eccentric cap 32B rather than the hex-socketed cap shown in the earlier Figures, the slotting 32D there allowing for acceptance of a screwdriver. It may be turned from a conventional or Phillips-head type screw, for example.

In the FIG. 11 construction, the bolt member 33 is also generally like member 15 but has an eccentric offset hex-socket upper end or cap 33B which differs from what appears in FIGS. 1-3, 5 and 6 in that its periphery 33C, though a surface of revolution about the eccentric axis 20—20, is of downwardly-tapering truncated conical form rather than cylindrical. In turn, that allows the cooperating nut-like clamp member 34, which like member 16 has one or more peripheral "flats" or other workpiece-engaging side surfaces (not shown in FIG. 11), to be fashioned without any lower retaining shoulder such as the annular shoulder 161(FIG. 1). Instead, its inner bearing surface 34G, which mates closely with the "crankshaft" outer bearing surface 33C, needs merely be correspondingly tapered, as shown, and it will be retained without likelihood of being accidentally dislodged once the bolt threaded end 33A has been engaged within a suitable mounting plate, T-nut, or the like. As with the earlier-described assembly, full tightening is avoided.

FIG. 12 shows how the nut-like clamping member, there numbered 35, may be modified to suit special purposes; for example, one face is part of an angle-bracket portion 35A, and another, 35B, is at a radially shorter distance and has a downward slope which can aid in holding a thin workpiece down upon the mount, 17. Other workpiece-engaging faces which may also serve particular needs are illustrated in association with another clamp member 36, in FIG. 13; that member will be recognized as- generally like member 16, except that it has side surfaces which include notching, 36B, and serration-like roughening, 36C, and concave curvature, 36D. Various ones of the work-engaging features of the clamp members of FIGS. 12 and 13 may of course be used alone, or repeated, or combined.

Plastic, or metals other than those named, may be substituted in either or both clamping members, as may be appropriate to intended uses. Although preferred constructions involve mechanical interlocking between the bolt-like and nut-like clamp members, by way of provisions such as the retaining shoulder or taper-to-taper fit which have been described, it may be expedient in some instances to allow the nut-like clamp member to remain removable and replaceable with one of another shape or size without fully unscrewing the cooperating threaded bolt-like member; magnetic attraction or snap-fitting may hold the nut-like member to the mount, and/or to the bolt-like member, to avoid unwanted separations during set-up, for example. More than one clamping assembly may of course be used to secure a workpiece, in a vise-like, chuck-like or other array. Although the use of additional parts is not currently preferred, similar operating results can be realized with an assembly in which the needed eccentric offset is provided by a separate part keyed eccentrically to the upper end of an otherwise symmetrical bolt. The bolt-like member may in some cases be locked in place, once clamping has been brought about. It should therefore be understood that the specific practices and embodiments described and shown herein have been presented by way of disclosure, rather than limitation, and that various modifications, combinations and substitutions may be effected by those skilled in the art without departure in spirit or scope from this invention in its broader aspects and as set forth in the appended claims.

What I claim as new and desire to secure by Letters Patent of the United States is:

1. An orbital-action two-part clamp for holding a workpiece in relation to a mount, comprising first clamping means having at its lower end a support portion adapted to be supported within an accommodating recess in the mount when inserted therein and being angularly adjustable in relation thereto about an axis, and an upper eccentric free end portion integral with and above said lower portion and having outer peripheral bearing surfaces which are disposed outwardly above said recess in said mount when said lower end is inserted therein and which have a center eccentrically offset laterally in relation to said axis, and second clamping means having inner peripheral bearing surfaces fitted for relative angular motion closely about said outer peripheral surfaces and further having at least one workpiece-engaging face displaced laterally outwardly away from said bearing surfaces, said upper eccentric free end portion of said first clamping means extending laterally beyond said support portion at said lower end, said free end portion having outer surface area and said second clamping means having inner surface area which mechanically catch and interfere with one another and thereby prevent unintended separation of said first and second clamping means when they are mated together and said lower end of said first clamping means is supported in said mount, said outer and inner surface areas being disposed to leave space laterally about said first clamping means to accommodate orbital movement of said second clamping means without jamming, said workpiece-engaging face extending substantially transversely in opposite angular directions form a radius to said axis and thereby promoting wedging actions which resist turning and loosening of said second clamping means in either angular direction about said axis once said second clamping means has been orbited into an engagement with a workpiece centered substantially at the site of said radius, wherein the maximum distances between the workpiece and said workpiece-engaging face of said second clamping means do not exceed twice the lateral offset between said axis and said center of said outer peripheral bearing surfaces of said first clamping means, wherein at least one of said peripheral surfaces comprises a surface of revolution substantially concentric with said center which is eccentrically offset in relation to said axis, said first clamping means further including angular-adjustment provisions in the form of surfaces shaped and disposed to fit separately and cooperatively with a torque-applying tool and to respond to angular movement of the tool by angularly adjusting orientation of said upper eccentric end portion about said axis, whereby said second clamping means may be caused to orbit about said axis and thereby to move said workpiece-engaging face thereof in relation to said axis and laterally into and out of engagement with a nearby workpiece by angularly adjusting said first clamping means by no more than one-half turn about said axis by way of said angular-adjustment provisions.

2. An orbital-action two-part clamp for holding a workpiece in relation to a mount, comprising first clamping means having a lower portion adapted to be inserted into and to be supported within an accommodating recess in the mount and being angularly adjustable in relation thereto about an axis, and an upper eccentric end portion above said lower portion and having outer peripheral bearing surfaces which are disposed outwardly above said recess in said mount when said lower portion is inserted therein and which have a center eccentrically offset laterally in relation to said axis, and second clamping means having inner peripheral bearing surfaces fitted for relative angular motion closely about said outer peripheral surfaces and further having at least one workpiece-engaging surface displaced laterally outwardly away form said bearing surfaces, said first clamping means further including angular-adjustment provisions in the form of surfaces shaped and disposed to fit separably and cooperatively with a torque-applying tool and to respond to angular movements of the tool by angularly adjusting orientation of said upper eccentric end portion about said axis, wherein said surfaces of said angular-adjustment provisions of said first clamping means are those of a shaped recess in the upper exposed end of said eccentric portion, said recess being shaped to receive therein the cooperatively-shaped end of a separable tool by which turning torques may be applied to adjust the orientation of said upper eccentric end portion of said first clamping means angularly about said axis, wherein the maximum distances between the workpiece and said workpiece-engaging surface of said second clamping means do not exceed twice the lateral offset between said axis and said center of said outer peripheral bearing surfaces of said first clamping means, wherein at least one of said peripheral surfaces comprises a surface of revolution substantially concentric with said center which is eccentrically offset in relation to said axis, and wherein said second clamping means is of material softer than that of said eccentric portion of said first clamping means, whereby said second clamping means may caused to orbit about said axis and thereby to move said workpiece-engaging surface thereof in relation to said axis and laterally into and out of engagement with a nearby workpiece by angularly adjusting said first clamping means by no more than one-half turn about said axis by way of said angular-adjustment provisions.

3. An orbital-action two-part clamp for holding a workpiece in relation to a mount, comprising first clamping means having a lower portion adapted to be inserted into and be supported within an accommodating recess in the mount and being angularly adjustable in relation thereto about an axis, and upper eccentric end portion above said lower portion and having outer peripheral bearing surfaces which are disposed outwardly above said recess in said mount when said lower portion is inserted therein and which have a center eccentrically offset laterally in relation to said axis, and second clamping means having inner peripheral bearing surfaces fitted for relative angular motion closely about said outer peripheral surfaces and further having at least one workpiece-engaging surface displaced laterally outwardly away form said bearing surfaces, wherein in the maximum distances between the workpiece and said workpiece-engaging surface of said second clamping means do not exceed twice the lateral offset between said axis and said center of said outer peripheral bearing surfaces of said first clamping means, wherein at least one of said peripheral surfaces comprises a surface of revolution substantially concentric with said center which is eccentrically offset in relation to said axis, said first clamping means further including angular-adjustment provisions in the form of surfaces shaped and disposed to fit separately and cooperatively with a torque-applying tool and to respond to angular movements of the tool by angularly adjusting orientation of said upper eccentric end portion about said axis, wherein said mount includes a T-nut which is slidable within and locks with a T-slot of a T-slotted machine table, wherein said accommodating recess is located in said T-nut, and wherein said lower portion of said first clamping means is disposed within said recess in said T-nut, whereby said second clamping means may be caused to orbit about said axis and thereby to move said workpiece-engagement surface thereof in relation to said axis and laterally into and out of engagement with a nearby workpiece by angularly adjusting said first clamping means by no more than one-half turn about said axis by way of said angular adjustment provision.

* * * * *